(12) United States Patent
Draper (10) Patent No.: US 7,759,809 B2
(45) Date of Patent: Jul. 20, 2010

(54) ELECTROMAGNETIC ENERGY DEVICE AND METHOD

(76) Inventor: Ricky Venoie Draper, 200 Southpeak, Ponder, TX (US) 76259

( * ) Notice: Subject to any disclaimer, the term of this patent is extended or adjusted under 35 U.S.C. 154(b) by 550 days.

(21) Appl. No.: 11/774,048

(22) Filed: Jul. 6, 2007

(65) Prior Publication Data

US 2009/0009024 A1 Jan. 8, 2009

(51) Int. Cl.
*F02B 63/04* (2006.01)
*H02K 19/00* (2006.01)
*H02K 17/00* (2006.01)

(52) U.S. Cl. ........................ 290/1 R; 310/203
(58) Field of Classification Search .............. 290/1 R; 310/14, 203
See application file for complete search history.

(56) References Cited

U.S. PATENT DOCUMENTS

| | | | | | |
|---|---|---|---|---|---|
| 342,666 | A | * | 5/1886 | Williams | 310/14 |
| 783,001 | A | * | 2/1905 | Wagner | 310/27 |
| 1,231,193 | A | * | 6/1917 | Powers | 335/256 |
| 1,241,333 | A | * | 9/1917 | Bowman | 124/3 |
| 2,106,730 | A | * | 2/1938 | Foster | 352/133 |
| 3,202,886 | A | * | 8/1965 | Kramer | 335/234 |
| 4,862,021 | A | * | 8/1989 | LaRocca | 310/10 |
| 5,625,241 | A | | 4/1997 | Ewing et al. | 310/156 |
| 5,663,605 | A | | 9/1997 | Evans et al. | 310/181 |
| 5,767,601 | A | | 6/1998 | Uchiyama | 310/190 |
| 6,169,343 | B1 | | 1/2001 | Rich, Sr. | 310/15 |
| 6,232,690 | B1 | | 5/2001 | Schmider | 310/156 |
| 6,278,204 | B1 | * | 8/2001 | Frenette | 310/24 |
| 6,515,390 | B1 | | 2/2003 | Lopatinsky et al. | 310/178 |
| 6,940,200 | B2 | | 9/2005 | Lopatinsky et al. | 310/178 |
| 7,145,274 | B2 | | 12/2006 | Uemura et al. | 310/74 |
| 7,185,541 | B1 | | 3/2007 | Edelstein | 73/514.16 |
| 7,187,099 | B1 | | 3/2007 | Morimatsu et al. | 310/194 |
| 2002/0070613 | A1 | * | 6/2002 | Cordiale | 310/14 |
| 2003/0173836 | A1 | * | 9/2003 | Inagaki et al. | 310/14 |
| 2004/0100099 | A1 | * | 5/2004 | Eaton et al. | 290/1 R |

* cited by examiner

*Primary Examiner*—Julio C. Gonzalez
(74) *Attorney, Agent, or Firm*—Charles D. Gunter, Jr.

(57) ABSTRACT

An apparatus and method are shown for improving the efficiency of motors, generators and machines by using a closed ferromagnetic frame upon which is mounted a plurality of solenoid coils. Two of the solenoid coils are wired together so that they act as one in a closed wiring circuit. An associated armature assembly includes a carousel which carries additional solenoid coils and is rotated through an opening provided in an extension to the closed frame. The individual solenoid coils located on the carousel supply power to the two original solenoid coils on the ferromagnetic frame giving the basic circulation system amplification each time a solenoid enters the electric/magnetic field created by the frame uprights.

6 Claims, 5 Drawing Sheets

ELECTROMAGNETIC ENERGY DEVICE AND METHOD

BACKGROUND OF THE INVENTION

1. Field of the Invention

This invention relates to the field of electromagnetic devices such as motors, generators and machines and to methods for improving the efficiency thereof and more particularly to a high-efficiency electrical generator having a large number of applications.

2. Description of the Prior Art

The present invention has its basis in known laws relating to physics, magnetism and kinetic energy. It is generally understood that moving electrons like other moving matter contain kinetic energy. For example, electrons moving from negative to positive electrodes contain kinetic energy. Similarly, electrons moving between magnetic poles contain kinetic energy.

As electrons move from a negative electrode to a positive electrode, they create a current. A moving election also creates a magnetic field around itself. The direction of the magnetic field is sometimes explained for simplicity in terms of the "right hand rule." In electromagnetism, the right-hand rule can be used to determine the direction of the magnetic field produced by a rotating electric charge. This is done by first curling a person's right hand in the direction of the rotating current. When this is done, then the thumb on the right hand points in the direction of the resulting magnetic north pole. The magnetic field will also have an oppositely arranged south pole. A magnetic pole attracts a pole of opposite magnetic polarity. Conversely, two like magnetic poles repel each other.

Traditional generators capture the flow of electrons created by induction when a magnet is moved relative to a coil. A magnet having two poles, one magnetically north and the other magnetically south, is aligned so that one pole is facing the coil with the other, opposite pole, facing away from the coil. As the magnet is brought nearer the coil, the approaching magnetic field increases flux in the coil, which induces an electrical current that tends to oppose the change in flux in the coil. The direction of the current reverses as the magnet passes the center of the coil as the north pole moves away from the coil. In this particular arrangement, this reversing current is an alternating current. These principles are well understood and are utilized at the present time in the design of reciprocating motors and engines. Rotary designs of generators and motors also rely on the same principles of magnetic induction as reciprocating motors and engines.

A large body of patent art exists which embodies various offshoots of the above described principles of electromagnetism. For example, U.S. Pat. No. 6,169,343, issued Jan. 2, 2001, to Rich, Sr., is typical of a number of prior art reference which discuss the various implications of the magnetic fields which surround current-carrying coils. The Rich, Sr., reference is directed toward improving the efficiency of prior art generators and motors by reducing the counter electromotive forces which are typically present in the prior art devices of the type described above. This patent discloses a piston and coil arrangement that promotes magnetic attraction and repulsion between the coil and the outside poles. The coil is an electromagnet, and when a current is passed through the coil, a magnetic field is created with a magnetic polarity. The motion of the piston and the magnetism are aligned in the particular scheme which is shown in this reference in order to increase the efficiency of the device.

A number of prior art references use "carousel" type components in their physical design. For example, U.S. Pat. No. 5,625,241 teaches a permanent magnet generator having stationary coils positioned in a circle and a carousel carrying corresponding groups of permanent magnets through the centers of the coils. U.S. Pat. No. 5,663,605 is also a rotating electrical machine with electromagnetic and permanent magnet excitation being utilized in the design. U.S. Pat. No. 5,767,601 discloses a device that generates electricity in armature coils by the rotation of permanent magnets placed on a rotor.

U.S. Pat. No. 6,232,690 shows a DC motor having an air gap and a stator coil positioned within the air gap. First and second permanent magnet rotors are coaxially arranged to one another in the housing on opposite sides of the air gap. At least one permanent magnet rotor has an axially magnetized annular rotor magnet.

U.S. Pat. No. 6,515,390 shows a rotor made in the form of two disks. The stator is made in the form of coils that are distributed over the circumference and that are installed predominantly in the space between the rotor poles. They provide for the possibility of an "end face interaction" with the rotor poles. The circumferential array of coils, each being wound about an axis parallel to the shaft, generate an axially directed electromagnetic field that interacts with north and south flux lines.

Additionally, U.S. Pat. No. 6,940,200 is a continuation-in-part of the previously described patent. This electric drive has windings between magnetized disks with a magnetic rotor and at least one stator. The magnetic rotor comprises at least two disks being made from ferromagnetic material and installed on a shaft, and the disks are magnetized in a direction parallel to the shaft. The stator is located between the two magnetized disks and comprises two layers of circumferentially arrayed coil windings etched on both sides of a printed circuit board and a controlling device. Each layer has several pairs of coil windings. One of the coil windings is interrupted for providing power leads to the controlling device.

Despite various advances in the electrical and electromagnetic arts of the type described above, a need continues to exist for a device and method for increasing the efficiency of electrical generators, motors and machines generally.

A need exists for such a device which is simple in design and economical to implement in a variety of useful real world applications.

A need exists for such a device which can be constructed from readily available materials and which is clean running and which does not require a high energy input for operation.

A need exists for such a device which can be powered from low energy input sources such as wind power or solar cells as opposed to the use of such energy sources as the burning of fossil fuels.

SUMMARY OF THE INVENTION

The present invention has as its object to provide a device and method for providing an electrical generator, motor or machine which meets the needs described in the prior art and which meets the previous objectives.

The invention is, in part, an apparatus for generating electrical currents. The apparatus of the invention includes, as a primary component, a closed frame formed of a ferromagnetic material. A first solenoid coil having a plurality of windings and a central opening is mounted on the closed frame with the frame passing through the central opening. The first solenoid coil has a first end with a magnetic-north, positive input and an opposed second end with a magnetic-south, negative output when energized. A second solenoid coil having a plurality of windings and a central opening is also mounted on the closed frame with the frame passing through the central opening. The second solenoid coil has a first end with a magnetic-south, negative input and an opposed second end with a magnetic-north, positive output when energized.

The first and second solenoid coils are wired together in a particular way in a special wiring circuit. The input of the first solenoid coil is connected to the output of the second solenoid coil and the input of the second solenoid coil is connected to the output of the first solenoid coil, thereby forming a closed wiring circuit which, in effect, allows the two solenoid coils to act as a single coil.

The apparatus, as described, is initially energized by connecting a source of DC current to the previously described wiring circuit for the first and second solenoid coils. This can be accomplished by using a standard DC battery having a positive terminal and a negative terminal. The input of the first solenoid coil is connected to the positive battery terminal and the output of the first solenoid coil is connected to the negative battery terminal, the second solenoid coil input and output being oppositely wired.

The previously described apparatus will also typically have an electrical energy output device which is also attached to the closed frame. In one preferred form, the electrical energy output device is a third solenoid coil having a plurality of windings terminating in a pair of output leads and a central opening, the third solenoid coil being mounted on the closed frame with the frame passing through the central opening.

In order to increase the current which can be extracted from the third solenoid coil, an armature assembly is operatively associated with the closed frame and first, second and third solenoid coils, the armature assembly being used to supply amplified power to the first and second solenoid coils. The particular armature assembly employed can comprise a pair of uprights connected to the closed ferromagnetic frame and separated by an opening therebetween, and a carousel which is arranged to pass through the opening between the uprights, the carousel having a plurality of additional solenoid coils mounted thereon. The solenoids mounted on the carousel each have a contact brush which is arranged to contact a mating contact surface which is connected electrically to the first and second solenoid coils mounted on the closed frame. As the carousel is rotated in the opening between the two uprights, power can be withdrawn from the system by attaching a load to the output leads from the third solenoid coil.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

DETAILED DESCRIPTION OF THE INVENTION

The embodiments herein and the various features and advantageous details thereof are explained more fully with reference to the non-limiting embodiments that are illustrated in the accompanying drawings and detailed in the following description. Descriptions of well-known components and processes and manufacturing techniques are omitted so as to not unnecessarily obscure the embodiments herein. The examples used herein are intended merely to facilitate an understanding of ways in which the invention herein maybe practiced and to further enable those of skill in the art to practice the embodiments herein. Accordingly, the examples should not be construed as limiting the scope of the claimed invention.

Applicant's invention provides an improved apparatus for generating electrical currents. The two primary features upon which the present invention relies are the use of what will be herein termed a "closed frame system" and a "closed circuit wiring system." To the best of Applicant's knowledge, no electromagnet configuration has, up to this time, ever used a "closed frame system" as will be presently described. This is probably due to the fact that such a closed flame actually nullifies the use of it as an electromagnet as is commonly understood and implemented at the present time. With respect to Applicant's closed circuit wiring scheme, such designs have similarly not been utilized in the presently available devices because the laws of physics tells us that without a consistent electrical input into the solenoid coils of an electromagnet, the power would run down too quickly for it to be very useful, specifically in larger industrial applications.

Without wishing to be bound to any particular theory of operation, the primary principle which underlies the operation of the present invention can be summarized in the phrase—"closed systems of circulation." This phrase is applicable to both of the two basic components that make up the invention; the solid iron or ferromagnetic frame and the two solenoids which are used to make the solid iron frame into an electromagnet.

The closed frame utilized herein is an iron or ferromagnetic frame that is either a solid piece of ferromagnetic material or individual pieces of ferromagnetic material welded, bolted, or otherwise constructed into the shape of a solid frame. This particular construction insures the "closed system of circulation" attributed to the ferromagnetic frame or base structure of Applicant's design. While the particular embodiment of the frame 11 illustrated in FIG. 1 is a rectangle, it will be apparent from the discussion which follows that the frame could be of other polygonal shape, or could conceivably be round or oval.

Applicant's closed frame design might be analogized in a simplistic fashion to what is sometimes referred to in the relevant magnet arts as a "keeper bar." The common keeper bar can usually be found attached to any horseshoe shaped magnet that can be purchased in a toy store or hobby shop, or from any industrial source for magnets. This keeper bar is attached or better described as stuck to the two individual legs or prongs of the horseshoe shaped magnet. The purpose and/ or action of a keeper is to temporarily bridge the gap between the two poles of the magnet and by so doing to create a "closed circuit" configuration which allows the magnetic field to circulate around the ferromagnetic horseshoe design without losing its magnetic intensity. This preserves the strength of the magnet between the extended time periods when it is not being used. Detaching the keeper from a horseshoe magnet allows the magnet to be used as needed; having retained its full magnetic strength because of the use of the keeper in between uses. Thus, the closed or solid frame concept embodied in Applicant's closed frame is simulated repeatedly in the common configuration of a keeper bar, with the exception that the keeper bar is detachable.

Figure 1:
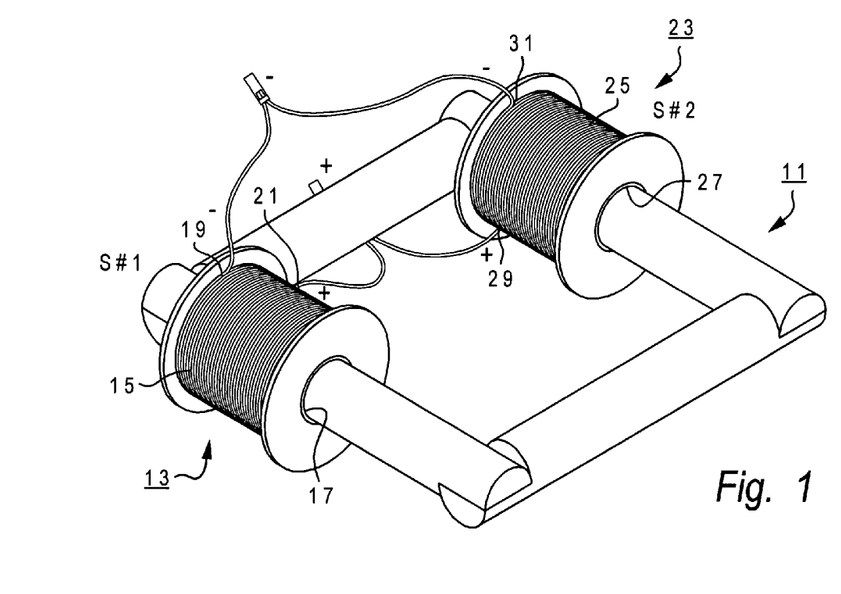
FIG. 1 is a simplified perspective view of one version of the closed frame and first and second solenoids used in forming the apparatus of the invention.

In addition to the previously described closed frame, Applicants apparatus for generating electrical energy also incorporates a plurality of "solenoid coils." For example, as shown in FIG. 1, a first solenoid coil 13 having a plurality of windings 15 and a central opening 17 is positioned on the frame 11. The first solenoid coil 13 is mounted on the closed frame 11 with the frame passing through the central opening 17. The first solenoid coil 13 has a first end or region 19 which comprises a magnetic-north, positive input and an opposed second end or region 21 which comprises a magnetic-south, negative output when energized.

In a similar fashion, a second solenoid coil 23 is also positioned on the frame 11. The second solenoid coil 23 also has a plurality of windings 25 and a central opening 27. The second solenoid coil being 23 is mounted on the closed frame with the frame passing through the central opening 27. The second solenoid coil 23 has a first end or region 29 with a magnetic-south, negative input and an opposed second end or region 31 with a magnetic-north, positive output when energized.

As used in this discussion, the term "solenoid coil" is intended to mean a current-carrying coil of wire that acts like a magnet when a current passes through it. The term is not intended to mean an assembly used as a switch, consisting of a coil and a metal core free to slide along the coil axis under the influence of the magnetic field, as that term is sometime used. The solenoid coils used in the practice of the present invention are each a long coil of wire consisting of multiple loops. The coils may be comprised of any number of multiple turns using any gage of copper wire in order to obtain the desired effects. For example, in one actual installation, the coils were comprised of 3000 turns of no. 28 copper wire. The magnetic field strength of such a solenoid coil is the sum of the fields created by each individual loop, multiplied by the amperes of current running through the wire. Placing a piece of iron in the center of the solenoid creates an electromagnet. The iron greatly increases the magnetic strength of the solenoid because the individual domains in the iron become aligned by the magnetic field created by the current. Thus, the resulting magnetic field is the sum of the current running through the circular wire loops plus the magnetic field created by the aligned domains of the iron core. The iron typically used in electromagnets is referred to as soft iron because it quickly loses its magnetism once the current in the wire is cut off and quickly regains magnetism once the current being supplied to the device is turned on.

As briefly discussed in the Background portion of the specification, basic theories of physics, electromagnetism and electricity can be used to explain the workings of a solenoid coil of the type described which are used in Applicant's invention. It is well known and common knowledge that magnets have two specific individual forces that are generally referred to as poles. Since these two poles are not the same they have been designated individual names that we have all come to recognize and refer to as North and South. It is also common knowledge that these two individual poles have specific laws of physics that they adhere to, such as, if two North poles are brought together or if two South poles are brought together they repel each other. Similarly, if two different magnetic poles are brought together they attract each other. The actual magnetic force itself is attracted to some metallic or ferromagnetic materials such as iron, nickel and cobalt.

These metallic or ferromagnetic materials are configured so that their atomic structure naturally contains small individual regions called "domains." Each of these individual domains react independently of each other and when magnetically influenced they each establish the properties of a small individual magnet complete with a small North pole domain and a small South pole domain. In a raw piece of ferromagnetic material the small individual domains are in a random natural configuration which cancels the magnetic properties. However when a magnet is placed in close proximity to a piece of natural ferromagnetic material the small individual domains within the material align themselves respectively in accordance to the magnetic pole force exerted on them and before temporarily magnetized. This temporary alignment of the small individual domains naturally cause the North pole domains to attract the South pole domains and the South pole domains to attract the North pole domains respectively, as is the natural law of any magnet.

It is also a well known common law of physics that if an electrical current is run through a copper wire it naturally produces a magnetic field around the wire. In a straight segment of copper wire carrying an electrical current the magnetic field actually forms a cylindrically configured region around the wire that establishes itself by using the wire as its central axis of stabilization. When a segment of wire having an electrical current running through it is shaped into a circle or loop design it creates a natural magnetic field that physically circumscribes the wire loop. This naturally created magnetic field around the wire actually resembles a regular physical magnet. The end of the wire where the magnetic field enters the segment of wire acts as the South pole domain and the end where the magnetic force exits the segment of wire acts as the North pole domain.

As will be apparent in the discussion which follows, the present invention relates to sustaining the magnetic properties of an electromagnet where the ferromagnetic frame is closed and/or solid. More specifically, the present invention relates to sustaining the actual continual circulation of the magnetic force flowing through the electromagnet's ferromagnetic closed frame after the initial electrical power which has been used to "energize" the system has been removed.

As will be explained in detail, the system of the invention also utilizes a special wiring scheme to connect the various solenoids used in the system. The significance of the wiring scheme can best be explained in terms of certain fundamentals of solenoid designs. The design of the common solenoid coil is simple in nature, many loops of electrically conductive wire are tightly wound around a bobbin or spool frame. The frame is usually made from a nonconductive material such as brass or aluminum. The wire is layered onto the spool in a systematic fashion with the first row being laid at the bottom of the spool's frame closest to the center. Each layer of wire is then stacked one on top of the other until the appropriate number of loops have been added to the spool. As has been mentioned, the end of the wire where the magnetic field enters the segment of wire acts as the South pole domain and the end where the magnetic force exits the segment of wire acts as the North pole domain. The electrical power is normally initiated through this first row of loops closest to the center of the spool's frame. Thus, this end acts as the South pole domain of the solenoid and the exiting end of the wound spool naturally becomes the North pole of the solenoid. An electromagnet normally is constructed with two solenoids, one on each leg or prongs of the horseshoe design.

It maybe be helpful to distinguish the specific wiring of the first and second solenoids of the invention from the typical wiring of the two solenoids used in a standard electromagnet. When an electromagnet is powered from a standard DC battery the solenoids are attached so that the North pole magnets run closest to the center of one of the solenoids and the South pole magnets run closest to the center of the other solenoid. Thus, there are four electrical connections, one North pole and one South pole for each of the two solenoids. This equals out the amplification of each of the individual poles and makes the electromagnet as strong as it can be, in respect of the input of electrical power being supplied to the electromagnet.

Figure 2:
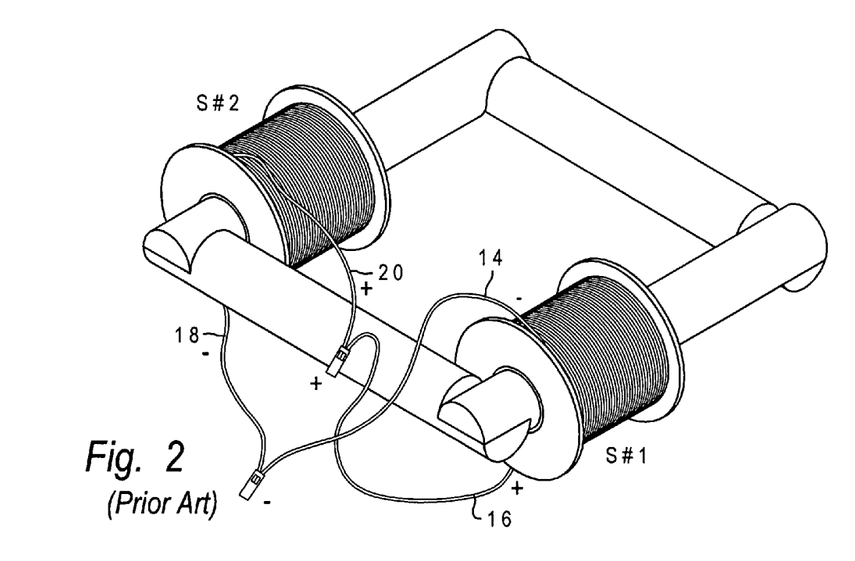
FIG. 2 is a view similar to FIG. 1, but showing the typical wiring circuit of a prior art electromagnet for purposes of comparison.

To provide a more specific example, with reference to FIG. 2 of the drawings, the wiring of a typical prior art electromagnet will now contrasted to the special wiring scheme utilized in the practice of the present invention. The two individual solenoids present in a typical electromagnet design are located on each of the two legs or prongs of the electromagnet and will be referred to as "S#1" and "S#2", respectively (shown on Applicant's frame for purposes of comparison). Each of these solenoids "S#1" and "S#2" has two wires (14, 16 and 18, 20, respectively) protruding from them, one of these wires is always a North pole domain and one is always a South pole domain. For instance, the input wire 16 which is closest to the center of "S#1" is connected to the North or Positive pole of a standard DC battery. As a result, the input into "S#1" is consequently a North pole domain; which, based on the magnetic laws of physics, automatically creates a South pole domain coming out of the opposite end, i.e., the exit wire 14 of "S#1". This exit wire of "S#1" is always connected to the South or Negative pole of the battery in order to fully saturate the solenoid with electrical power. However "S#2" is wired completely oppositely to that of "S#1", meaning that the input wire 18 closest to the center of "S#2" is connected to the South or Negative pole of the DC battery making the input into "S#2" a South pole domain which, in turn, automatically makes the output wire 20 of "S#2" a North pole domain, each of the wire leads being connected to the DC battery in a fashion corresponding to its respective pole domain.

The wiring schematic of the first and second primary solenoid coils used in the practice of Applicant's invention differs from that used for wiring a standard electromagnet, because the two individual solenoids are directly wired together so that they work as one.

FIG. 1 provides a comparative example which can be used to explain the difference in Applicant's system and the prior art electromagnet wiring. However, in Applicant's inventive system, "S#1" and "S#2" are wired in a manner which is exactly opposite to that previously described, i.e., "S#1" has a North or positive input 21 and a South or negative output 19 while "S#2" has a South or negative input 31 and a North or positive output 29, with each of the four wires connected to the DC battery in respect to its particular pole. In other words, Applicant's system features a wiring circuit connecting the first and second solenoid coils which are located on the closed frame, and wherein the input of the first solenoid coil is connected to the output of the second solenoid coil and the input of the second solenoid coil is connected to the output of the first solenoid coil, thereby forming a closed wiring circuit.

In actually wiring the device of the invention, the DC battery is first disconnected completely. There are now four wires or leads extending from the two solenoid coils, two wires protrude from each of the two solenoid coils. The input wire of "S#1" which will maintain its North or positive pole domain is connected directly to the output wire of "S#2" which will also maintain its North or positive pole domain. In similar fashion, the input wire of "S#2" which will maintain its South or negative pole domain is now connected directly to the output wire of "S# 1 " which also maintain its South or negative pole domain.

At this point, Applicant wishes to make clear that at no point is it being claimed or suggested that more power could ever be extracted from a system than is being put into the system in some form. Applicant's inventive principles are consistent with known laws of physics including the law of "conservation of Mass-Energy" that states in simple terms that "the total energy in a closed or isolated system is constant, no matter what happens". Also applicable is the law of "conservation of momentum", which states in simple fashion that "the total momentum, in a closed system remains constant."

Unlike the devices of the prior art, Applicant's two individual solenoids used in the design do not work separately or independently as was the case in standard electromagnet design. They are actually wired together in such a way as to work together as one individual solenoid that creates a "closed system of circulation" between the two individual solenoid coils. Once the two solenoids are wired correctly they can then be charged. This can be conveniently accomplished through the use of, for example, a DC battery of some kind. The battery serves as a source of DC current initially connected in the wiring circuit in order to initially "energize" the apparatus. Preferably, the source of DC current is a battery having a positive terminal and a negative terminal, and wherein the input of the first solenoid coil is connected to the positive battery terminal and the output of the first solenoid coil is connected to the negative battery terminal, the second solenoid coil input and output being oppositely wired.

After charging for approximately an hour (when using a standard 12 volt car battery), the battery can be disconnected and the solenoids will stay "energized" to some extent. Initially charging the pair of solenoid coils, wired as previously described, creates the "closed system of circulation" of the solenoids themselves.

When these two individual "closed systems of circulation", (the ferromagnetic frame and the double-solenoids) are combined into one individual machine and/or structured device they work together in synergistic fashion to maintain a consistent magnetic circulation within the ferromagnetic frame. This is a very basic design. The power of this system is equivalent to and is in direct proportion to the electrical power circulating within the double-solenoid or "closed system of circulation" design. This circulating magnet power will not vary in its intensity due to this particularly described "closed system of circulation" configuration that has been created between the ferromagnetic material and the double-solenoid design.

Two additional basic laws of physics may be considered to be employed in a design of this type. The first law is Newton's first law of motion, sometimes referred to as "the law of inertia" which states: "An object at rest tends to stay at rest and an object in motion tends to stay in motion with the same speed and in the same direction—unless acted upon by an unbalanced force." The second law that may help to explain the theory of operation of the invention is Kirchhoff's first law or current law that specifically states that: "The algebraic sum of current into any junction is zero." Since current is the flow of electrons through a conductor, it cannot build up at a junction, meaning that current is conserved: "what comes in must come out." Both of these basic laws of physics have application in fully comprehending reaction created using the wiring schematic of this particular specially form of electromagnet.

Figure 3:
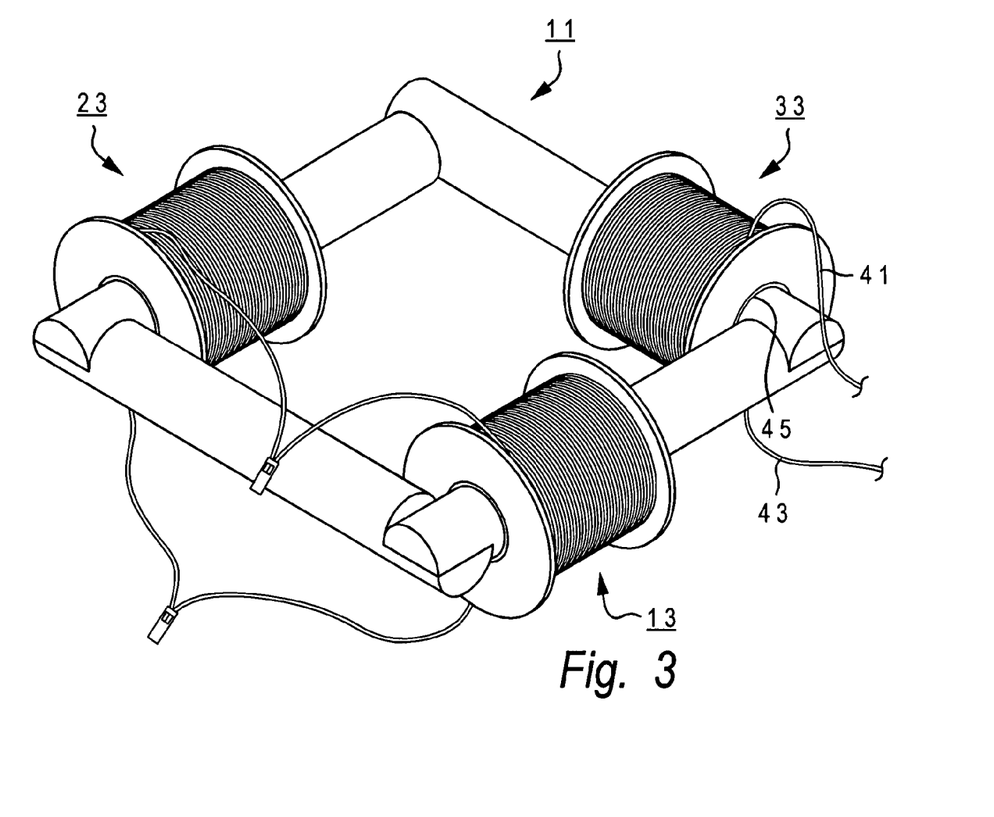
FIG. 3 is a view similar to FIG. 1, but showing the addition of the third solenoid coil to the closed frame.

Applicant's previously described "closed system of circulation" preferably also has connected thereto some sort of electrical energy output device. For example, as shown in FIG. 3, the electrical energy output device can be a third solenoid coil 33 having a plurality of windings terminating in a pair of output leads 41, 43 and a central opening 45, the third solenoid coil 33 being mounted on the closed frame 11 with the frame passing through the central opening 45. Such a third solenoid coil acts as an extraction attachment for the circulating electrical power within the "closed frame circuit" as explained above.

In other words, in Applicant's most basic design described above, the electrons or magnetic properties within the ferromagnetic structure are simply circulating within the "closed system" design. In order to extract the circulating electron or magnetic properties there has to be an opening of some kind which will allow this to be done "without" disrupting the "closed system" that has been stabilized. This can be accomplished by adding to the "closed system" already in place, a third solenoid (such as solenoid 33 in FIG. 3) which offers its two protruding wires 43, 45 as outlet ports or extraction ports. This third solenoid 33 also re-amplifies the already circulating electrons or magnetic properties trapped within the "closed system."

Experiments show that adding this third solenoid has no special effect on the "closed system" by itself. However, when a good strong neodymium magnet is brought into close proximity of any of the three solenoids 13, 23 and 33 and the magnet is then rotated at a reasonable RPM it causes the electron or magnetic properties of the "closed system" to exit the system by way of the two exit ports offered by the third solenoid 33 that has been added as described above. The measurable output of useable electrical power extracted from this configuration varies and is directly proportional to both the gauss power and the RPM speed of the neodymium magnets that are used.

Figure 4:
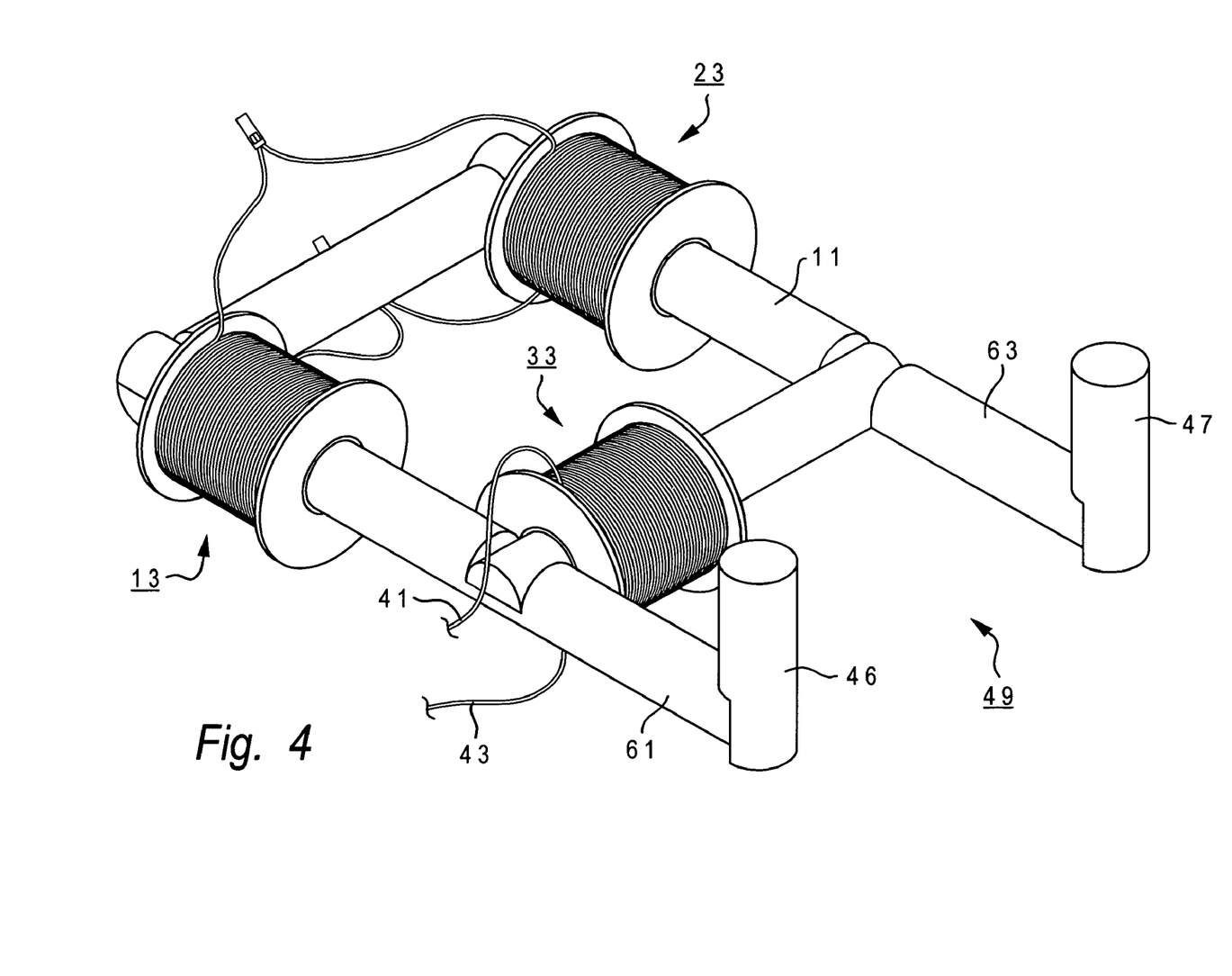
FIG. 4 is a view of the apparatus of the invention showing the addition of the uprights of the armature assembly which forms a part of the overall assembly.
Figure 5:
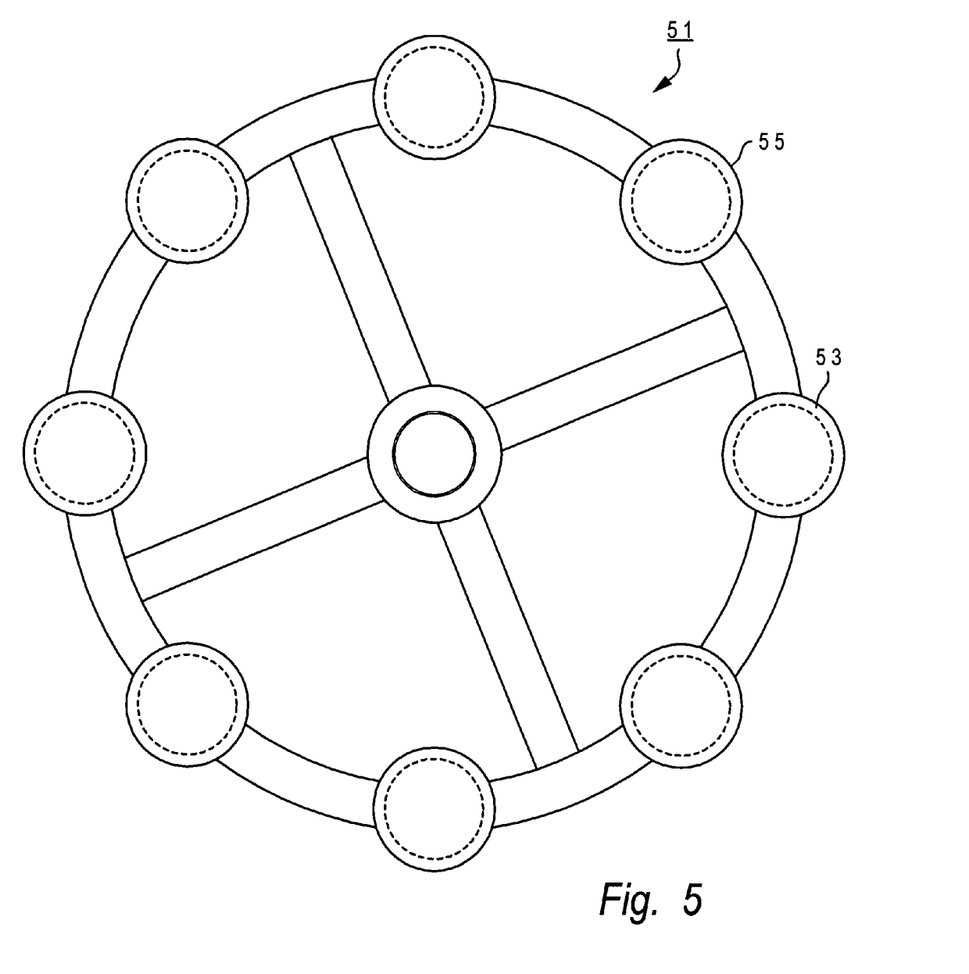
FIG. 5 is a simplified side view of the carousel which forms a part of the armature assembly of the device of the invention.

In the final aspect of the present invention, the previously described system has added thereto what will be referred to herein as an "armature assembly", the purpose of which is to mimic the function of the previously described neodymium magnet. The armature assembly, when operatively associated with the closed frame 11 and first, second and third solenoid coils (13, 23 and 33, respectively), supplies amplified power to the first and second solenoid coils, 13, 23. The armature assembly which is illustrated in FIG. 4 of the drawings includes a pair of uprights 46, 47 connected to the closed ferromagnetic frame 11 and separated by an opening 49. As illustrated in simplified fashion in FIGS. 5 and 6, a carousel 51 is arranged to pass through the opening 49 between the uprights 46, 47, the carousel having a plurality of additional solenoid coils (e.g. coils 53, 55, etc.) mounted thereon. In the particular implementation of the principles of the invention illustrated in FIG. 3, each of the solenoids mounted on the carousel has a contact brush (57 in FIG. 6) which is arranged to contact a mating contact brush 59 which is connected electrically to the first and second solenoid coils 13, 23 mounted on the closed frame 11.

Thus, in the more basic implementation of Applicant's inventive system, having the three solenoid coils constructed together in one machine and/or structured device, as explained above, the output of useable electrical power is minimal because it relies on the rotating magnet for its output. However, the addition of the armature assembly with its rotating solenoid assembly begins to amplify the power input enormously and the full potential as well as the numerous individual applications can be better appreciated once this has been accomplished.

The addition of the armature assembly must be accomplished while keeping the "closed system" of the invention completely intact. In order to accomplish this, modifications of the ferromagnetic frame are required. Thus, as has been explained with reference to FIG. 4, the frame 11 has been redesigned with the addition of the frame extensions 61, 63 and uprights 46, 47 in order to accommodate the structure of the "rotating solenoid wheel" or carousel 51; while at the same time keeping the "closed system" intact. However, once the wheel 51 is in proper position it replaces the power input of the rotating magnet with the amplified power input of multiple solenoids rotating at a better RPM and with a much higher magnitude of intensity.

Figure 6:
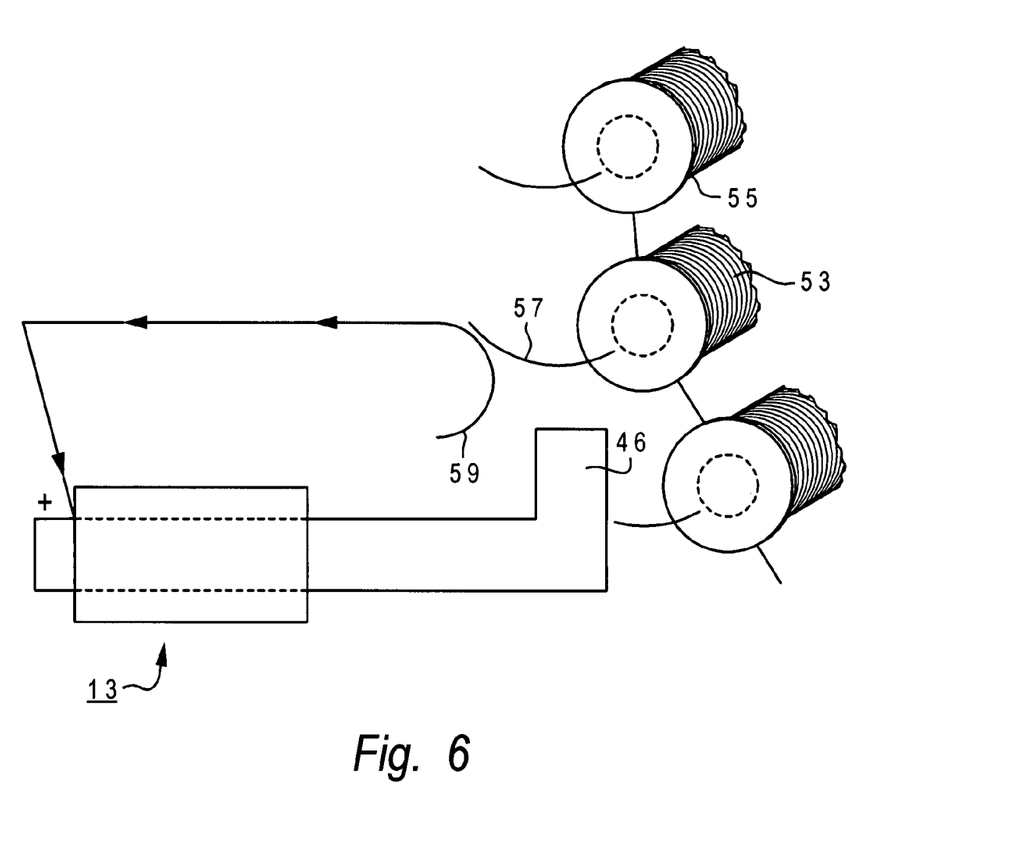
FIG. 6 is a simplified, partly schematic view of the brush, contact and wiring assembly which operatively associates the carousel with the uprights of the closed frame.

FIG. 6 is a simplified, partly schematic view of the brush, contact and wiring assembly which operatively associates the carousel 51 with the uprights 46, 47 of the closed frame 11 and which illustrates one form of the amplification system which can be used with the previously described closed frame and closed wiring system of the invention. In FIG. 6, each of the rotating solenoids 53, 55 on the wheel or carousel 51 has a brush 57 which contacts an extraction point on the main apparatus, the extraction point in this case being a contact surface 59. As the wheel rotates, each coil's brush makes brief contact with the contact surface 59 provided on the main frame. The contact surface on the frame is electrically wired to, for example, the positive input of the illustrated solenoid 13 coil. Power can be extracted from the third solenoid coil (33 in FIG. 4) by means of the positive and negative leads 41, 43 shown. The carousel wheel 51 can be rotated in any convenient manner. For example, an adjustable DC motor (not shown) could be used to operate the wheel, with its direct power input being drawn from the system.

The present invention provides several advantages. The novel wiling design of the system of the invention interconnects the two primary solenoid coils located on the closed frame, giving the two individual solenoids the ability to operate as one single closed circuit solenoid component in order to sustain the circulation of electric/magnetic properties within the solenoids. The solid, ferromagnetic frame structure of the system of the invention is connected on all four sides in order to complete the closed circuit needed in order to sustain the circulation of electric/magnetic properties within the solid frame which is produced by the consistent circulation of electric/magnetic properties within the closed circuit solenoid component, as previously described. The combination of the closed wiring circuit and the closed frame structure result in the basic foundation of the electric/magnetic circulation system design of the invention. The addition of a third solenoid coil to the closed frame provides a convenient extraction point, making it possible to extract the accumulated power from the basic closed circuit system, once additional power is made available.

The modification of the basic closed frame to add the uprights and carousel solenoid arrangement allows the individual solenoid coils to be "energized" as they enter the electric/magnetic field which the armature arrangement produces. The armature arrangement makes it possible for the individual solenoid coils located on the rotating wheel to supply power to the two original solenoid coils located on the electromagnetic frame that work together as one component, giving the basic circulation system amplification each time a solenoid coil enters the electric/magnetic field of the armature arrangement.

The interactions of each of the individually described areas noted above, all working in harmony with each other in order to insure and complete the circulation and energizing of the electric/magnetic closed circuit system, produces the properties necessary for the amplified generation of electrical power.

While the invention has been shown in only one of its forms, it is not thus limited but is susceptible to various changes and modifications without departing from the spirit thereof. For example, either the ferromagnetic frame or the solenoid wheel could be rotated relative to the other. Similarly, the carousel can be in a vertical position or in a horizontal position. The complete system can be of any size, depending upon the intended end application. Other variations will be apparent to those skilled in the art after studying the foregoing specification.

What is claimed is:

1. An apparatus for generating electrical currents comprising:
    a closed frame formed of a ferromagnetic material;
    a first solenoid coil having a plurality of windings and a central opening, the first solenoid coil being mounted on the closed frame with the frame passing through the central opening, the first solenoid coil having a first end with a magnetic-north, positive input and an opposed second end with a magnetic-south, negative output when energized;
    a second solenoid coil having a plurality of windings and a central opening, the second solenoid coil being mounted on the closed frame with the frame passing through the central opening, the second solenoid coil having a first end with a magnetic-south, negative input and an opposed second end with a magnetic-north, positive output when energized;
    a wiring circuit connecting the first and second solenoid coils which are located on the closed frame., and wherein the input of the first solenoid coil is connected to the output of the second solenoid coil and the input of the second solenoid coil is connected to the output of the first solenoid coil, thereby forming a closed wiring circuit;
    further comprising an electrical energy output device attached to the closed frame;
    wherein the electrical energy output device is a third solenoid coil having a plurality of windings terminating in a pair of output leads and a central opening, the third solenoid coil being mounted on the closed frame with the frame passing through the central opening;
    further comprising an armature assembly, operatively associated with the closed frame and first, second and third solenoid coils which supplies amplified power to the first and second solenoid coils; and
    wherein the armature assembly includes a pair of uprights connected to the closed ferromagnetic frame and separated by an opening, and a carousel which is arranged to pass through the opening between the uprights, the carousel having a plurality of additional solenoid coils mounted thereon.

2. The apparatus of claim 1, wherein the solenoids mounted on the carousel each has a contact brush which is arranged to contact a mating contact brush which is connected electrically to the first and second solenoid coils mounted on the closed frame.

3. A method of generating electrical currents, the method comprising the steps of:
    forming a closed frame from a ferromagnetic material;
    providing a first solenoid coil having a plurality of windings and a central opening, the first solenoid coil being mounted on the closed frame with the frame passing through the central opening, the first solenoid coil having a first end with a magnetic-north, positive input and an opposed second end with a magnetic-south, negative output when energized;
    providing a second solenoid coil having a plurality of windings and a central opening, the second solenoid coil being mounted on the closed frame with the frame passing through the central opening, the second solenoid coil having a first end with a magnetic-south, negative input and an opposed second end with a magnetic-north, positive output when energized;
    wiring the first and second solenoid coils together in a wiring circuit, whereby the input of the first solenoid coil is connected to the output of the second solenoid coil and the input of the second solenoid coil is connected to the output of the first solenoid coil, thereby allowing the two solenoid coils to operate as one single closed solenoid circuit which assists in sustaining the circulation of electric/magnetic properties within the two solenoids;
    wherein a source of DC current is initially connected in the closed solenoid wiring circuit in order to initially energize the first and second solenoid coils;
    wherein the source of DC current is a battery having a positive terminal and a negative terminal, and wherein the input of the first solenoid coil is connected to the positive battery terminal and the output of the first solenoid coil is connected to the negative battery terminal, the second solenoid coil input and output being oppositely wired;
    comprising the further step of attaching an electrical energy output device to the closed ferromagnetic frame;
    wherein the electrical energy output device is a third solenoid coil having a plurality of windings terminating in a pair of output leads and a central opening, the third solenoid coil being mounted on the closed frame with the frame passing through the central opening; and
    further comprising the steps of attaching a load to the output leads from the third solenoid coil and drawing off electrical current from the apparatus.

4. The method of claim 3, further comprising the steps of operatively associating an armature assembly with the closed frame and first, second and third solenoid coils, the armature assembly being used to supply amplified power to the first and second solenoid coils which, in turn, provide electrical current to the third solenoid coil for extraction through the output leads thereof.

5. The method of claim 4, armature assembly includes a pair of uprights connected to the closed ferromagnetic frame and separated by an opening therebetween, and a carousel which is arranged to pass through the opening between the uprights, the carousel having a plurality of additional solenoid coils mounted thereon.

6. The method of claim 5, wherein the solenoids mounted on the carousel each has a contact brush which is arranged to contact a mating contact surface on the closed frame, the mating contact surface being connected electrically to the first and second solenoid coils mounted on the closed frame.

* * * * *